United States Patent [19]
Pittmon et al.

[11] Patent Number: 5,814,192
[45] Date of Patent: Sep. 29, 1998

[54] VAPOR COMPRESSION DISTILLATION APPARATUS

[75] Inventors: Lee Pittmon, Post Falls, Id.; Randy Wasilenko, St. Nelson, Canada; Brian Fisk, Portland, Oreg.

[73] Assignee: Terra Mannix Inc., Calgary, Canada

[21] Appl. No.: 720,783

[22] Filed: Oct. 3, 1996

[51] Int. Cl.$^6$ .............................. B01D 3/14; F28F 13/12
[52] U.S. Cl. .................... 202/182; 202/186; 202/202; 202/235; 159/28.6; 165/109.1; 165/159
[58] Field of Search .................. 165/109.1, 159; 202/172, 182, 186, 202, 235; 159/28.6

[56] References Cited

U.S. PATENT DOCUMENTS

| | | | |
|---|---|---|---|
| 4,168,211 | 9/1979 | Pottharst, Jr. .............................. | 203/10 |
| 4,398,595 | 8/1983 | Small .................................. | 165/109 R |
| 4,585,523 | 4/1986 | Giddings .................................. | 202/236 |
| 5,587,053 | 12/1996 | Keith ...................................... | 202/172 |
| 5,597,453 | 1/1997 | Sears ......................................... | 203/24 |
| 5,645,694 | 7/1997 | Stewart et al. ............................. | 203/22 |

*Primary Examiner*—Nina Bhat
*Attorney, Agent, or Firm*—Murray E. Thrift; Adrian D. Battison

[57] ABSTRACT

A vapor compression distillation apparatus includes a vessel for containing a liquid to be distilled and a heat exchanger of the shell and tube type immersed in the liquid. The heat exchanger has top and bottom manifolds and vertical tubes surrounded by a shell. Foraminous vortex-drag induction plates extend across the shell between adjacent rows of tubes for inducing turbulence in the vortices to provide a better heat transfer from vapor passing through the shell to liquid in the tubes. Baffles are provided at selected intervals across the shell, between adjacent rows of tubes to produce a sinuous flow path for the heating medium. Steam injecting sparging tubes extend along the lower manifold of the heat exchanger to inject steam bubbles into the liquid to be evaporated. This produces turbulence in the tubes of the heat exchanger, promotes a better flow through the tubes and scrubs the tube interiors.

15 Claims, 6 Drawing Sheets

VAPOR COMPRESSION DISTILLATION APPARATUS

FIELD OF THE INVENTION

The present invention relates generally to heat exchangers and more particularly to improvements in heat exchangers useful in vapor compression distillation systems, and to systems using the heat exchangers.

BACKGROUND OF THE INVENTION

Vapor compression distillation is a process that may be used in the purification of contaminated water. Briefly, contaminated water is heated in the heat exchanger and removed from the system as steam. The steam is then compressed, increasing its vapor pressure and its temperature. Next, the steam is passed through the heat exchanger, where it transfers its heat to the liquid. This process is generally recognized as thermo-dynamically efficient. The evaporation section generally entails the use of a shell and tube type heat exchanger. These are normally accepted as having maximum heat transfer values, and as a result have had little or no variation in their design or performance.

However, it is clear that there are still improvements that could be made to further increase efficiency. This is becoming increasingly important, as efforts to reduce environmental pollution by purifying contaminated waters are expanding.

The present invention is therefore concerned with improvements in the apparatus used in vapor compression distillation.

SUMMARY OF THE INVENTION

According to one aspect of the invention, there is provided a heat exchanger of the shell and tube type, comprising first and second manifolds, tubes connecting the manifolds for passing a first fluid therebetween, and a shell having an inlet and an outlet, said shell surrounding the tubes for confining a flow of a second fluid from the inlet to the outlet for heat exchange with the first fluid, said heat exchanger including means for creating turbulence in the flow of the second fluid as it passes around the tubes and through the shell.

When used in a vapor compression distillation apparatus, the first fluid is the liquid to be distilled, and the second fluid is the compressed vapor (steam).

The means for creating turbulence in the flow of the second fluid may comprise from one to several foraminous screens placed between adjacent tubes in the shell, each extending across the shell. The foraminous screens act as vortex-drag induction plates in that they will create turbulence in the flow of the second fluid. The turbulence will also increase the impingement upon the tubes of the heat exchanger, which will dramatically increase the heat transfer efficiency or "U" value of the unit. The plates also cause vortices to form that in turn cause the steam to condense.

According to another aspect of the invention, there is provided a heat exchanger of the shell and tube type, comprising two manifolds, tubes connecting the manifolds for passing a first fluid therebetween, and a shell having an inlet and an outlet, said shell surrounding the tubes for confining a flow of a second fluid from the inlet to the outlet for heat exchange with the first fluid, said heat exchanger including baffle means for deflecting the flow of the second fluid from a direct path from the inlet to the outlet of the shell into a sinuous path.

The baffles may comprise a plurality of spaced apart baffle plates, each extending across the shell between adjacent tubes in the shell. Diverting the flow of the second fluid creates a longer path for the second fluid to exchange its heat of vaporization with the first liquid fluid in the tubes, thereby increasing the condensation efficiency of the second fluid.

According to a further aspect of the invention, there is provided a heat exchanger of the shell and tube type, comprising top and bottom manifolds, tubes connecting the manifolds for passing a liquid first fluid therebetween, and a shell having an inlet and an outlet, said shell surrounding the tubes for confining a flow of a gaseous second fluid from the inlet to the outlet for heat exchange with the first fluid, said heat exchanger including sparging means for injecting bubbles of gaseous second fluid into the bottom manifold to pass through the liquid first fluid passing through the tubes.

This steam injection will agitate the flow of the first fluid in the tubes, thereby increasing its turbulence as it passes through the tubes. These bubbles will also have a scrubbing effect on the internal tube wall, thereby reducing scaling and increasing heat exchange efficiency by fifteen percent.

According to a still further aspect of the invention, there is provided a heat exchanger of the shell and tube type, comprising:
  two manifolds;
  a plurality of rows of parallel tubes connecting the manifolds for passing a first fluid therebetween;
  a shell having an inlet and an outlet, the shell surrounding the tubes for confining a flow of a second fluid from the inlet to the outlet in a direction across the rows of tubes for heat exchange with the first fluid;
  baffle means comprising a plurality of spaced apart baffle plates, each extending across the shell between adjacent rows of plates in the shell for deflecting the flow of the second fluid from a direct path across the rows of tubes into a sinuous path having portions thereof extending along the tubes;
  vortex-drag induction means comprising a plurality of foraminous plates, each extending across the shell between adjacent rows of tubes for creating turbulence in the flow of the second fluid as it passes around the tubes and through the shell.

There may be plural rows of tubes between adjacent baffle plates, with the number of rows of tubes between adjacent baffle plates increasing with spacing from the outlet towards the inlet. Additionally, there may be a baffle plate or a vortex-drag induction plate between each pair of adjacent rows of tubes.

According to another aspect of the invention, there is provided a vapor compression distillation apparatus comprising:
  a vessel for containing a liquid to be distilled;
  a shell and tube heat exchanger within the vessel, said heat exchanger comprising:
    top and bottom manifolds;
    tubes connecting the manifolds for passing the liquid to be distilled therebetween;
    a shell having an inlet and an outlet, said shell surrounding the tubes for confining a flow of vaporized liquid from the inlet to the outlet for heat exchange with the liquid in the tubes; and
    vortex-drag induction means for creating turbulence in the flow of vaporized liquid as it passes around the tubes and through the shell;
  means for supplying the liquid to be distilled to the vessel;

means for passing the liquid to be distilled into the bottom manifold;

means for releasing vaporized liquid from the top manifold;

means for collecting vapor from the vessel above the liquid therein;

means for compressing the collected vapor;

means for delivering the compressed vapor to the inlet of the heat exchanger shell; and means for collecting condensed vapor from the heat exchanger shell.

In preferred embodiments of the apparatus, the tubes are arranged in a plurality of rows of parallel tubes connecting the manifolds for passing a first fluid therebetween. Vortex-drag induction pates extend across the shell between adjacent rows of tubes for creating the turbulence in the flow of vapor. The heat exchanger includes baffle plates, each extending across the shell between adjacent rows of plates in the shell for deflecting the flow of the second fluid from a direct path across the rows of tubes into a sinuous path having portions thereof extending along the tubes.

BRIEF DESCRIPTION OF THE DRAWINGS

In the accompanying drawings, which illustrate an exemplary embodiment of the present invention.

DETAILED DESCRIPTION

Figure 1:
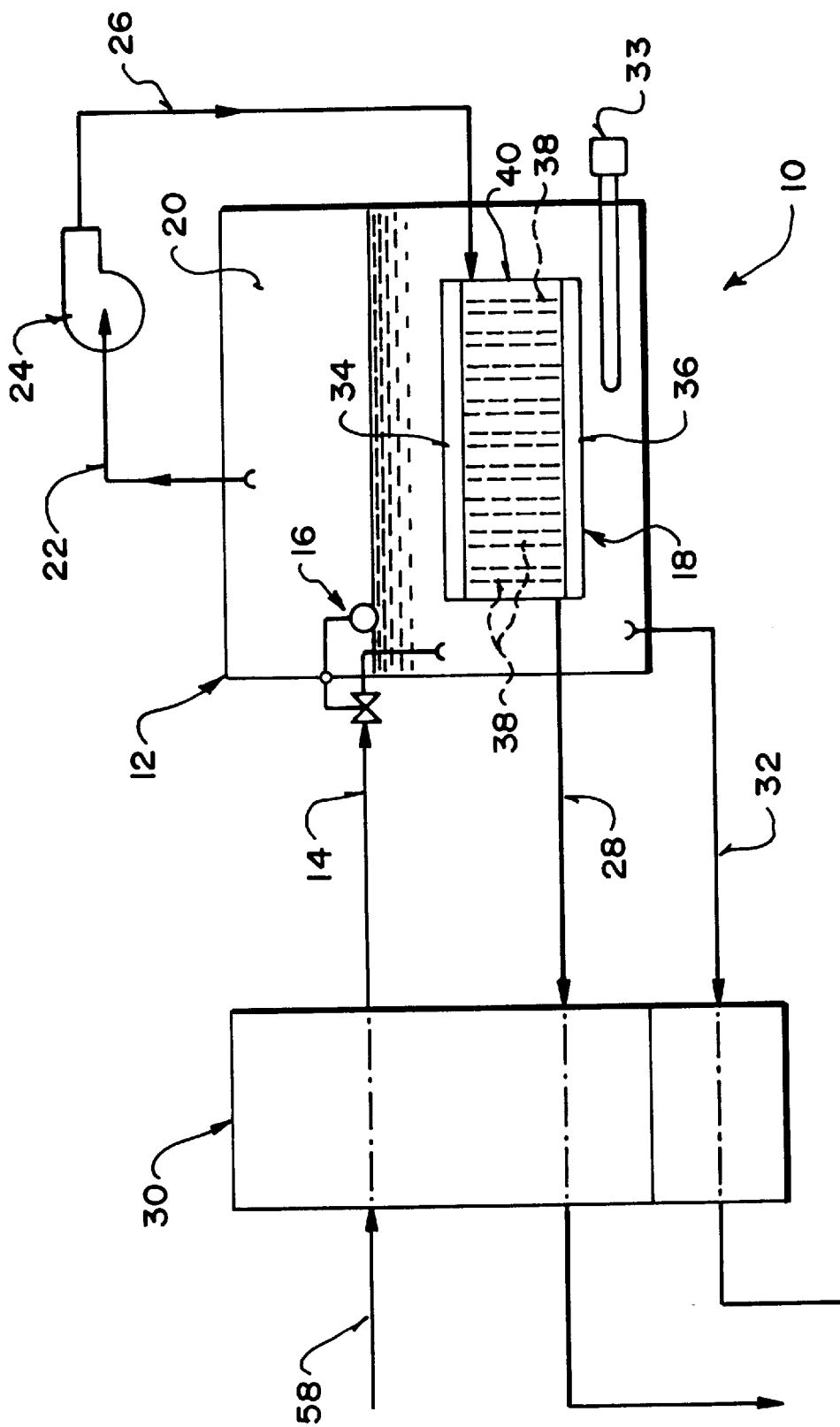
FIG. 1 is a schematic illustration of the vapor compression distillation apparatus.

Referring to the accompanying drawings, and particularly to FIG. 1, there is illustrated a vapor compression distillation apparatus 10. The apparatus includes a closed contaminated water vessel or tank 12. The tank has a contaminated water inlet 14 controlled by a float valve 16 to maintain a constant liquid level in the tank. Submerged in the liquid is a heat exchanger 18. The exchanger has a liquid side communicating with the liquid in the tank, and a vapor side isolated from the contaminated liquid.

The head space 20 at the top of the vessel 12 is connected via a steam conduit 22 to a compressor 24. The compressor outlet is coupled by a steam conduit 26 to the inlet to the vapor side of the heat exchanger. A conduit 28 from the heat exchanger vapor side outlet leads from the exchanger to a second, external heat exchanger 30 for transferring heat to the incoming contaminated liquid upstream from the tank 12.

A precipitated solids outlet 32 draws off a portion of the contaminated liquid in the tank along with settled solids. This flow is passed through the heat exchanger 30 to transfer its heat content to the incoming liquid stream.

An electric heater 33 in the tank 12 is used for initial pre-heating and periodically to supply make-up heat as required. The system operates primarily on the energy produced by the compressor.

The heat exchanger 18 is of the shell and tube type. It has a top manifold 34 and a bottom manifold 36, both of which are in open communication with the interior of tank 12. The tubes 38 joining the manifolds are vertical and arranged in staggered rows $R_1$ to $R_{23}$ across the shell 40, counting from the steam inlet towards the vapor outlet. The vapor inlet 42 is at one end of the shell, at the top, while the condensate outlet 44 is at the opposite end, at the bottom.

Figure 2:
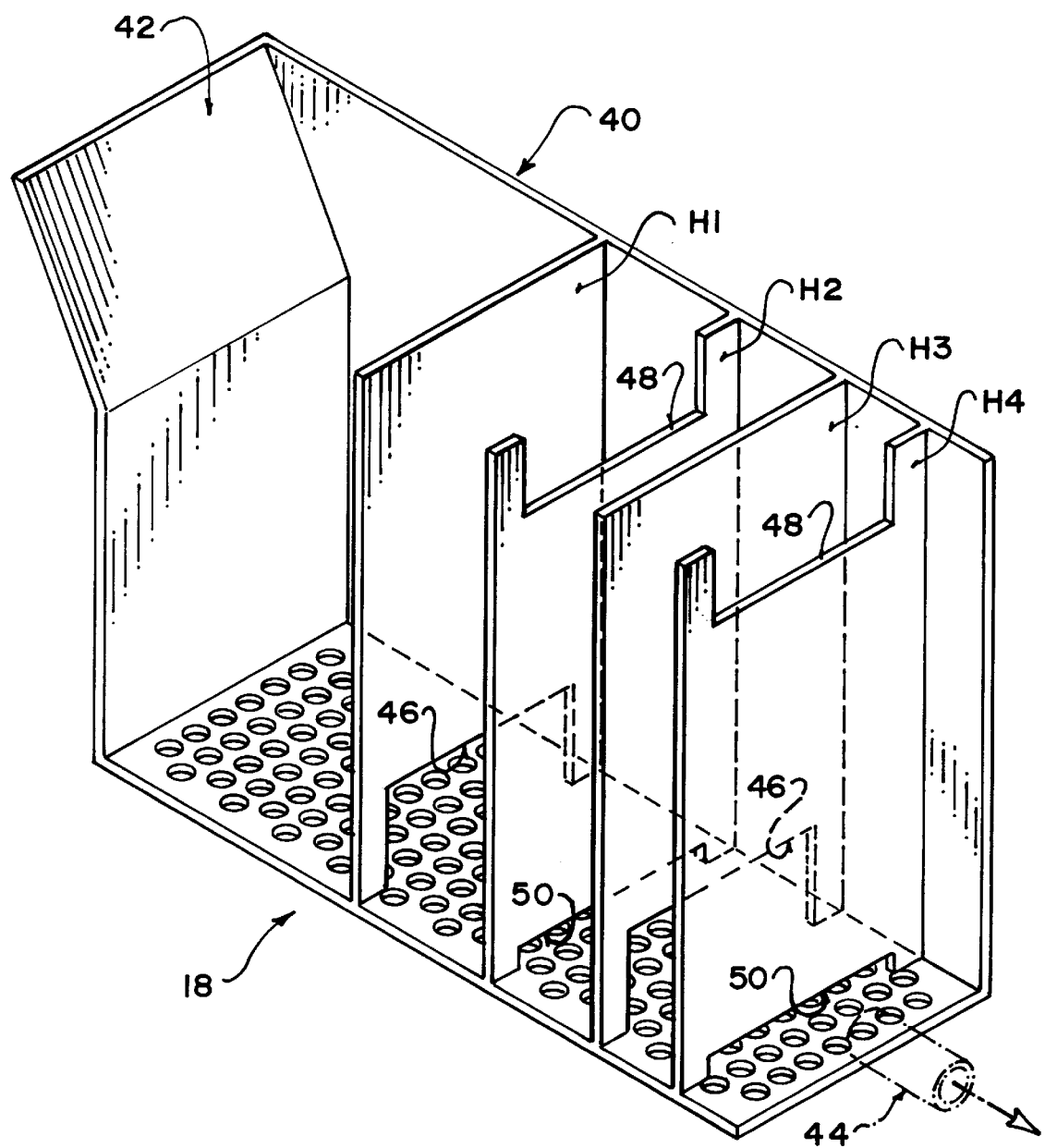
FIG. 2 is an isometric diagram showing the positioning of the baffles or 'H'-plates in relation to the outer walls of the shell.
Figure 3:
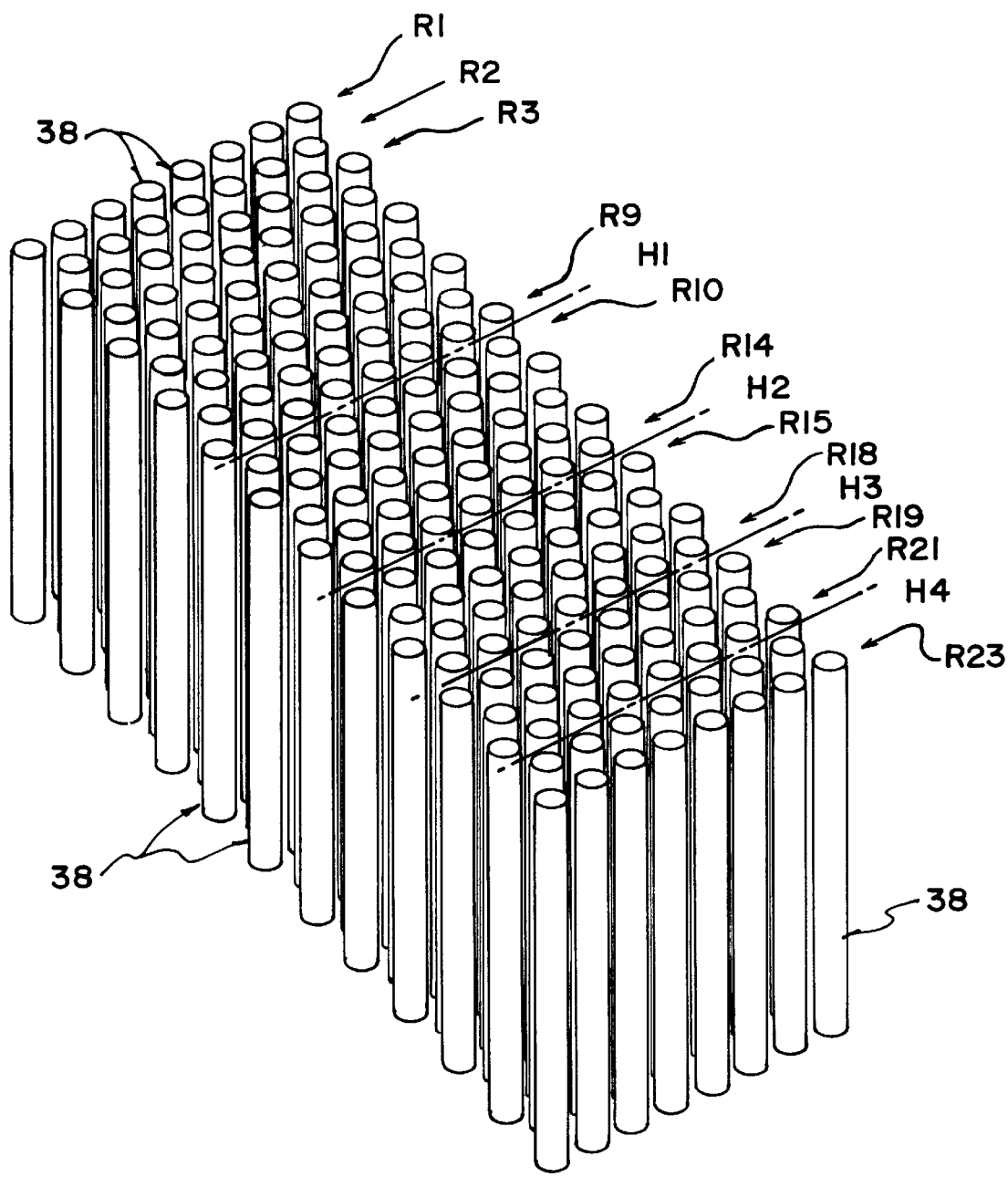
FIG. 3 is an isometric view showing the positioning of the baffles or 'H'-plates with respect to the tubes.
Figure 4:
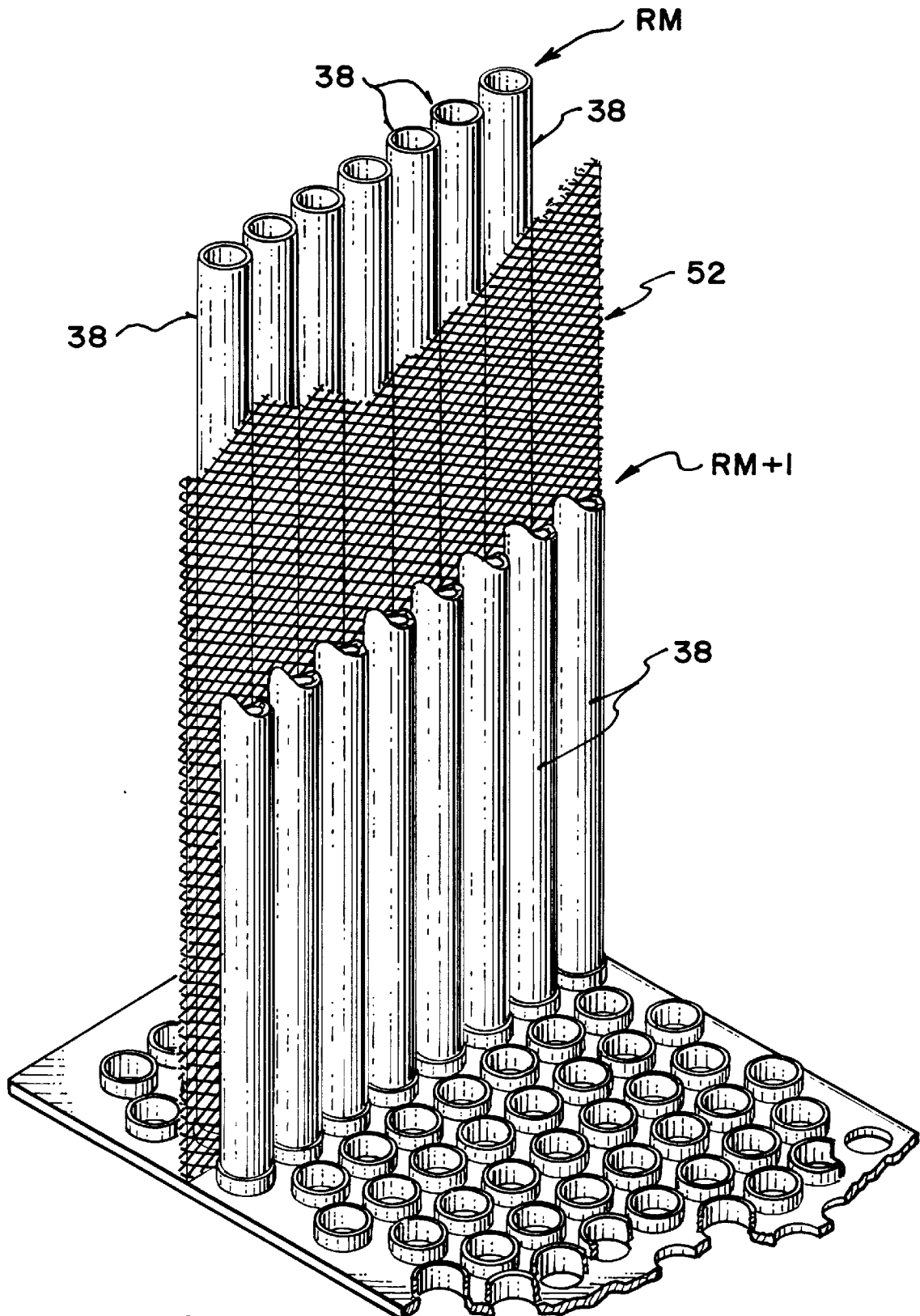
FIG. 4 is a partial isometric view showing the positioning of a vortex drag induction plate with respect to two adjacent tube rows.
Figure 5:
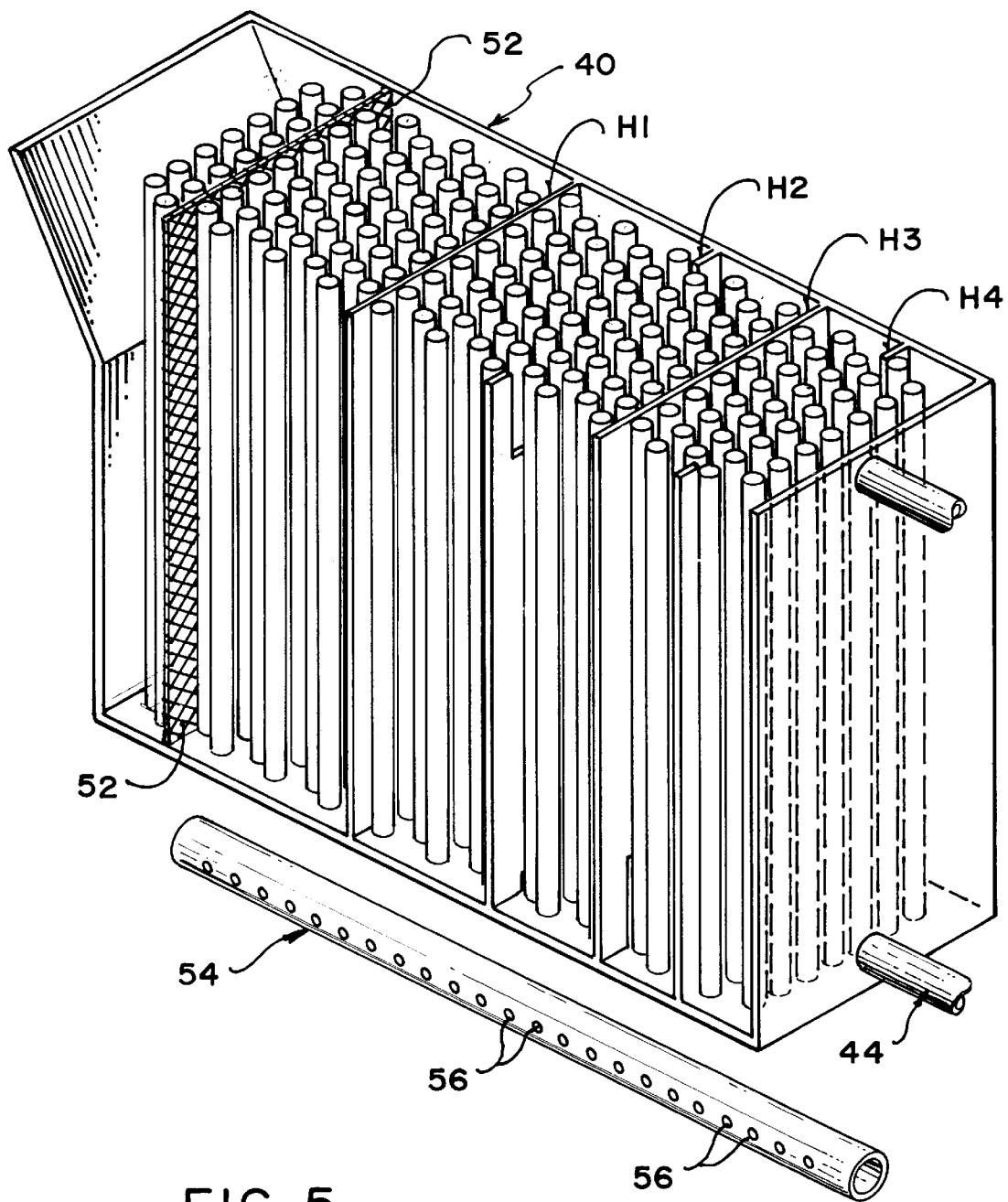
FIG. 5 is a partial isometric view of the heat exchanger showing the location of the sparging tubes.
Figure 6:
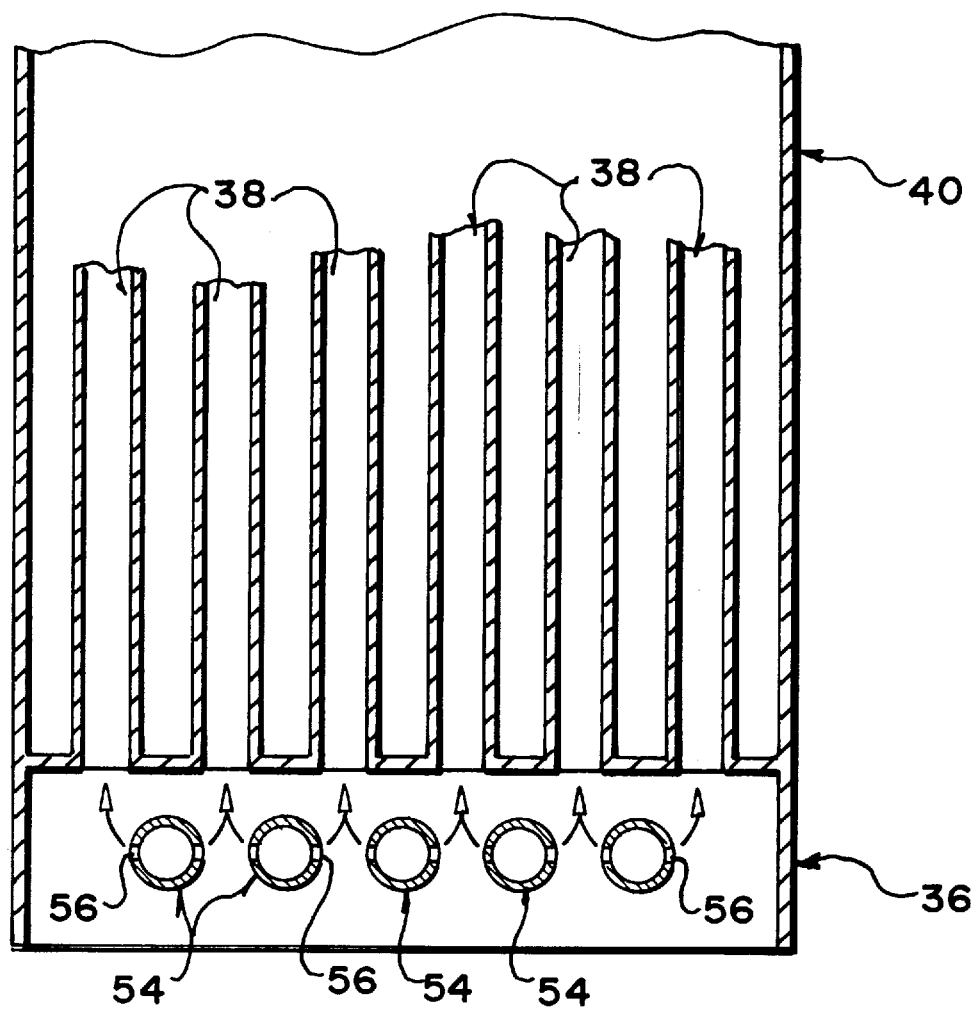
FIG. 6 is a sectional view of the heat exchanger showing the location of the sparging tubes.

Within the shell 40, between adjacent rows of the tubes 14 are four baffle plates $H_1$ to $H_4$, the locations of which are shown in FIG. 2. The number of rows of tubes between the baffles increases from the condensate outlet towards the steam inlet. In the illustrated embodiment, the baffles are between rows R9 and R10, R14 and R15, R18 and R19 and R21 and R22. Each of the baffle plates extends from side to side of the shell. Baffles $H_1$ and $H_3$ extend to the top of the shell and have steam slots 46 in their bottom edges. Baffles $H_2$ and $H_4$ have steam slots 48 in their top edges and smaller condensate slots 50 in their bottom edges. The baffles cause the condensed steam to travel in a sinuous path from the vapor inlet to the condensate outlet, with portions of the path extending along the tubes. This creates a longer path for the vapor to exchange its heat of vaporization with the liquid in the tubes. The positioning of the baffles also helps to prevent air locks from forming inside the exchanger.

Between adjacent rows of tubes where there is no baffle plate are vortex-drag induction plates 52. these are foraminous plates formed, in the illustrated embodiment, of expanded metal mesh. These create turbulence in the steam and cause vortices that promote condensation of the gaseous stream. The turbulence creates increased impingement upon the heat exchanger tubes and a significantly increased heat transfer efficiency or "U" value of the unit.

Extending the length of the bottom manifold 36 are five sparging tubes 54. These are connected to the compressor 24 to receive high pressure steam. Orifices 56 in the sparging tubes discharge the steam into the manifold to disperse bubbles of vapor into the liquid. This increases the flow velocity through the tubes 38. The bubbles have a scrubbing effect on the inside of the tube wall, reducing scaling and increasing heat exchange efficiency.

In operation, contaminated water is piped from the contaminated water source via conduit 58 into the heat exchanger 30 where the temperature is raised to 210° F. by recovering the heat from the discharging effluent. The preheated liquid is then delivered to the inlet 14 of tank 12. From the tank, water vapor (steam) is drawn into compressor 24 and is compressed from 1 psi to 4 psi. This increases the temperature of the vapor by approximately 10° F. The compressed steam is then delivered to the heat exchanger 18 where it exchanges its heat of vaporization with the liquid in the tank 12. The vapor condenses and flows out through conduit 18 to heat exchanger 30 where it exchanges its remaining heat with the incoming liquid stream. The condensate then flows to storage.

Approximately 5% of the incoming liquid flow is discharged through conduit 32 to remove solids that have precipitated in the vessel 12 as a result of super-saturation. This flow is passed through a section of heat exchanger 30 to transfer its heat to the incoming liquid stream.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. A heat exchanger of the shell and tube type, comprising first and second manifolds, tubes connecting the manifolds for sassing a first fluid therebetween, and a shell having an inlet and an outlet, said shell surrounding the tubes for confining a flow of a second fluid from the inlet to the outlet for heat exchange with the first fluid, said heat exchanger including sparging means for injecting bubbles of gaseous second fluid into the bottom manifold to pass through the liquid first fluid passing through the tubes.

2. A heat exchanger according to claim 1, said heat exchanger including means for creating turbulence in the flow of the second fluid as it passes around the tubes and through the shell.

3. A heat exchanger according to claim 2 wherein the means for creating turbulence in the flow of the second fluid comprises at least one foraminous screen placed between adjacent tubes in the shell.

4. A heat exchanger according to claim 3 including a plurality of foraminous screens, each extending across the shell.

5. A heat exchanger according to claim 2 including baffle means for deflecting the flow of the second fluid from a direct path from the inlet to the outlet of the shell into a sinuous path.

6. A heat exchanger according to claim 5 wherein the baffle means comprise a plurality of spaced apart baffle plates, each extending across the shell between adjacent tubes in the shell.

7. A heat exchanger according to claim 6 including plural rows of tubes between adjacent baffle plates.

8. A heat exchanger according to claim 7 wherein the number of rows of tubes between adjacent baffle plates increases with spacing from the outlet towards the inlet.

9. A heat exchanger according to claim 7 including a baffle plate or a vortex-drag induction plate between each pair of adjacent rows of tubes.

10. A heat exchanger of the shell and tube type, comprising top and bottom manifolds, tubes connecting the manifolds for passing a liquid first fluid therebetween, and a shell having an inlet and an outlet, said shell surrounding the tubes for confining a flow of a gaseous second fluid from the inlet to the outlet for heat exchange with the first fluid, said heat exchanger including sparging means for injecting bubbles of gaseous second fluid into the bottom manifold to pass through the liquid first fluid passing through the tubes.

11. A vapor compression distillation apparatus comprising:
 a vessel for containing a liquid to be distilled;
 a shell and tube heat exchanger within the vessel, said heat exchanger comprising:
  top and bottom manifolds;
  tubes connecting the manifolds for passing the liquid to be distilled therebetween;
  a shell having an inlet and an outlet, said shell surrounding the tubes for confining a flow of vaporized liquid from the inlet to the outlet for heat exchange with the liquid in the tubes; and
 vortex-drag induction means for creating turbulence in the flow of vaporized liquid as it passes around the tubes and through the shell:
  means for supplying the liquid to be distilled to the vessel;
  means for passing the liquid to be distilled into the bottom manifold;
  means for releasing vaporized liquid from the top manifold;
  means for collecting vapor from the vessel above the liquid therein;
  means for compressing the collected vapor;
  means for delivering the compressed vapor to the inlet of the heat exchanger shell;
  means for collecting condensed vapor from the heat exchanger shell; and
  sparging means for injecting bubbles of vapor into the bottom manifold to pass through the liquid passing through the tubes.

12. A distillation apparatus according to claim 11 wherein:
 the tubes comprise a plurality of rows of parallel tubes connecting the manifolds for passing a first fluid therebetween;
 the vortex-drag induction means comprise a plurality of foraminous plates, each extending across the shell between adjacent rows of tubes for creating turbulence in the flow of the vapor as it passes around the tubes and through the shell; and
 the heat exchanger includes baffle means comprising a plurality of spaced apart baffle plates, each extending across the shell between adjacent rows of plates in the shell for deflecting the flow of the second fluid from a direct path across the rows of tubes into a sinuous path having portions thereof extending along the tubes.

13. A distillation apparatus according to claim 12 including plural rows of tubes between adjacent baffle plates.

14. A distillation apparatus according to claim 13 wherein the number of rows of tubes between adjacent baffle plates increases with spacing from the outlet towards the inlet.

15. A distillation apparatus according to claim 12 including a baffle plate or a vortex-drag induction plate between each pair of adjacent rows of tubes.

* * * * *